US012579612B2

(12) United States Patent
Santos Ferreira et al.

(10) Patent No.: US 12,579,612 B2
(45) Date of Patent: Mar. 17, 2026

(54) SYSTEM AND METHOD FOR CONVOLUTION OF AN IMAGE

(71) Applicants:Lucas Santos Ferreira, Lund (SE); Patrik Persson, Lund (SE); Steffen Malkowsky, Lund (SE); Liang Liu, Södra Sandby (SE); Karl Åström, Lund (SE)

(72) Inventors: Lucas Santos Ferreira, Lund (SE); Patrik Persson, Lund (SE); Steffen Malkowsky, Lund (SE); Liang Liu, Södra Sandby (SE); Karl Åström, Lund (SE)

(73) Assignees: Lucas Santos Ferreira, Lund (SE); Patrik Persson, Lund (SE); Steffen Malkowsky, Lund (SE); Liang Liu, Södra Sandby (SE); Karl AstrÖm, Lund (SE)

( * ) Notice: Subject to any disclaimer, the term of this patent is extended or adjusted under 35 U.S.C. 154(b) by 361 days.

(21) Appl. No.: 18/251,683

(22) PCT Filed: Nov. 5, 2021

(86) PCT No.: PCT/SE2021/051108
§ 371 (c)(1),
(2) Date: May 3, 2023

(87) PCT Pub. No.: WO2022/098290
PCT Pub. Date: May 12, 2022

(65) Prior Publication Data
US 2024/0020804 A1 Jan. 18, 2024

(30) Foreign Application Priority Data
Nov. 6, 2020 (SE) .................................... 2051293-5

(51) Int. Cl.
*G06T 5/20* (2006.01)
*G06T 1/20* (2006.01)

(52) U.S. Cl.
CPC . *G06T 5/20* (2013.01); *G06T 1/20* (2013.01)

(58) Field of Classification Search
None
See application file for complete search history.

(56) References Cited

U.S. PATENT DOCUMENTS

2009/0290806 A1 11/2009 Lelescu
2015/0139560 A1 5/2015 Deweert et al.
2020/0301994 A1 9/2020 Dikici et al.

OTHER PUBLICATIONS

Nikou, Digital Image Processing, https://www.cs.uoi.gr/~cnikou/Courses/Digital_Image_Processing/Chapter_04c_Frequency_Filtering_(Circulant_Matrices).pdf, Mar. 13, 2019.*
(Continued)

*Primary Examiner* — Fan Zhang
(74) *Attorney, Agent, or Firm* — Kolitch Romano Dascenzo Gates LLP

(57) ABSTRACT
An image convolution accelerator system including processing elements having kernel elements corresponding to a generated Toeplitz-like kernel. The Toeplitz-like generated kernel is based on a desired convolution kernel and padded with zeros, and an image controller is configured to activate the processing elements to multiply the kernel elements with image data when image data from a same row of the image is allocated to all processing elements corresponding to a non-zero row of the Toeplitz-like kernel. At least one storage element is configured to store at least the number of columns of the image minus a dimension of the desired convolution kernel+1.

7 Claims, 18 Drawing Sheets

(56) References Cited

OTHER PUBLICATIONS

Liu et al., Sparse Systolic Tensor Array for Efficient CNN Hardware Acceleration, https://arxiv.org/pdf/2009.02381, Oct. 12, 2020).*

Basilevh, A tutorial on non-separable 2D convolutions in Vivado HLS, https://basile.be/2019/03/18/a-tutorial-on-non-separable-2d-convolutions-in-vivado-hls/, Mar. 18, 2019).*

Zhang, Jeff, et al.; "CompAct: On-chip Compression of Activations for Low Power Systolic Array Based CNN Acceleration", ACM Transactions on Embedded Computing Systems, vol. 18, No. 5s, Article 47; ACM, New York, NY, US, Oct. 2019.

Sze, Vivienne, et al.; "Efficient Processing of Deep Neural Networks: A Tutorial and Survey", arxiv.org, Cornell University Library, Ithaca, NY, DOI: 10.1109/JPROC.2017.2761740; Mar. 27, 2017.

Dave, Shail, et al.; "Hardware Acceleration of Sparse and Irregular Tensor Computations of ML Models: A Survey of Insights", arxiv. org, Cornell University Library, Ithaca, NY, DOI: https://doi.org/10.48550/arXiv.2007.00864; Jul. 2, 2020.

International Search Report and Written Opinion of the International Searching Authority from the Swedish Intellectual Property Office, in PCT/SE2021/051108 dated Jan. 18, 2022, which is an international application corresponding to this U.S. application.

Bosi, Bernard, et al.; "Reconfigurable Pipelined 2-D Convolvers for Fast Digital Signal Processing," obtained from IEEE Transactions on Very Large Scale Integration (VLSI) Systems, vol. 7, No. 3, p. 299-308, Sep. 1999.

Cheng, Yu, et al.; "An Exploration of Parameter Redundancy in Deep Networks with Circulant Projections," obtained from IEEE international conference on computer vision, p. 2857-2865, 2015.

Ding, Caiwen, et al.; "Circnn: Accelerating and Compressing Deep Neural Network Using Block-Circulant Weight Matrices," obtained from the 50th Annual IEEE/ACM International Symposium on Microarchitecture, Micro-50, p. 295-408, Oct. 14-18, 2017.

Qin, Zidi, et al.; "Accelerating Deep Neural Networks by Combining Block-Circulant Matrices and Low-Precision Weights," obtained from MDPI, Electronics, 8, 78, p. 1-18, Jan. 10, 2019.

Wang, Shuo, et al.; "C-LSTM: Enabling Efficient LSTM using Structured Compression Techniques on FPGAs," obtained from the 2018 ACM/SIGDA International Symposium on Field-Programmable Gate Arrays, p. 11-20, Feb. 25-27, 2018.

Wang, Yitu, et al.; "Reboc: Accelerating Block-Circulant Neural Networks in ReRAM," obtained from IEEE, 2020 Design, Automation & Test in Europe Conference & Exhibition, p. 1472-1477, Mar. 2020.

* cited by examiner

| $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 | 0 | 0 | 0 | 0 |
| 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 | 0 | 0 | 0 |
| 0 | 0 | 0 | 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 |
| 0 | 0 | 0 | 0 | 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ |

| $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 | 0 | 0 | 0 | 0 |
|---|---|---|---|---|---|---|---|---|---|---|---|---|---|---|---|
| 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 | 0 | 0 | 0 |
| 0 | 0 | 0 | 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 |
| 0 | 0 | 0 | 0 | 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ |

| $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 | 0 | 0 | 0 | 0 |
|---|---|---|---|---|---|---|---|---|---|---|---|---|---|---|---|
| 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 | 0 | 0 | 0 |
| 0 | 0 | 0 | 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 |
| 0 | 0 | 0 | 0 | 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ |

| $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 | 0 | 0 | 0 | 0 |
| 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 | 0 | 0 | 0 |
| 0 | 0 | 0 | 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ | 0 |
| 0 | 0 | 0 | 0 | 0 | $k_{00}$ | $k_{01}$ | $k_{02}$ | 0 | $k_{10}$ | $k_{11}$ | $k_{12}$ | 0 | $k_{20}$ | $k_{21}$ | $k_{22}$ |

SYSTEM AND METHOD FOR CONVOLUTION OF AN IMAGE

FIELD

The present disclosure relates to a system and method for convolution of data. More specifically, the disclosure relates to a system and method for convolution of an image through matrix multiplication with a Toeplitz-like kernel matrix.

BACKGROUND

With the current rise of autonomous vehicles, drones, virtual reality applications and much more, the need for robust, fast and efficient image processing is of great importance. These image processing systems must typically perform several difficult and computationally intensive tasks in real-time, with a limited energy budget and limited physical size. This becomes especially evident in the case of autonomous drones and virtual reality applications, where both limited battery capacity and physical size is a problem. For example, a 5 kg battery and a full-size graphics card cannot be attached to a small indoor drone with an expectation of the drone to fly.

What is common in all these applications is that they use images to estimate the 3D structure of the world and their position and orientation therein. To accomplish this, special points in the image are extracted, called salient points or feature points. These points have special characteristics such as high texture, uniqueness, that enables them to be extracted consistently in other images as well. By matching these features across several images, the 3D structure of the world can be estimated, as well as the orientation and position of the camera at the times when the images were taken. This allows an onboard system to keep track of where the drone, vehicle and/or a person is in an environment.

To find these salient points in an image we must extract various patterns around each point to evaluate the characteristics of that point. The number of pixel points in an image is usually very large and can vary from hundreds of thousands to several billions. The higher the resolution is, the more accurately a solution may be estimated. This means that feature extraction is a very heavy operation from a processing and power point of view. Typically, this step contributes to a significant amount of the processing time and power consumption in a system.

Hence there is a need for improved image processing.

SUMMARY

In view of that stated above, the object of the present disclosure is to at least partly overcome one or more of the above-identified limitations of the prior art. In particular, it is an object to have an improved image processing system and method.

According to a first aspect is an image convolution accelerator system comprising, processing elements comprising kernel elements corresponding to a generated Toeplitz-like kernel, the Toeplitz-like generated kernel is based on a desired convolution kernel and padded with zeros, and an image controller configured to activate the processing elements to multiply the kernel elements with image data when image data from a same row of the image is allocated to all processing elements corresponding to a non-zero row of the Toeplitz-like kernel.

According to a second aspect is an imaging apparatus comprising, an imaging unit configured to acquire an input image, an image convolution accelerator system comprising, processing elements comprising kernel elements corresponding to a generated Toeplitz-like kernel, the Toeplitz-like generated kernel is based on a desired convolution kernel and padded with zeros, and an image controller configured to activate the processing elements to multiply the kernel elements with image data when image data from a same row of the image is allocated to all processing elements corresponding to a non-zero row of the Toeplitz-like kernel.

According to a third aspect is an image processing method comprising the steps of, generating a Toeplitz-like kernel, the Toeplitz-like generated kernel is based on a desired convolution kernel and padded with zeros, activating processing elements comprising kernel elements corresponding to the generated Toeplitz-like kernel, such that the kernel elements are multiplied with image data when image data from a same row of the image is allocated to all processing elements corresponding to a non-zero row of the Toeplitz-like kernel.

According to a fourth aspect is a program that causes a computer to execute the steps of generating a Toeplitz-like kernel, the Toeplitz-like generated kernel is based on a desired convolution kernel and padded with zeros, activating processing elements comprising kernel elements corresponding to the generated Toeplitz-like kernel, such that the kernel elements are multiplied with image data when image data from a same row of the image is allocated to all processing elements (PE) corresponding to a non-zero row of the Toeplitz-like kernel.

In this application, a Toeplitz-like kernel should be understood as a being a doubly blocked circulant matrix kernel.

Further examples of the disclosure are defined in the dependent claims, wherein features for the fourth and subsequent aspects of the disclosure are as for the first to third aspects mutatis mutandis.

Some examples of the disclosure provide for summarizing partial results by processing elements and/or a storage element.

Some examples of the disclosure provide for storing partial results.

Some examples of the disclosure provide for timing image data between processing elements.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present disclosure, will be better understood through the following illustrative and non-limiting detailed description of the present disclosure, with reference to the appended drawings, where the same reference numerals will be used for similar elements, wherein.

DETAILED DESCRIPTION

The present disclosure will now be described more fully hereinafter with reference to the accompanying drawings, in which currently preferred examples of the disclosure are shown. This invention may, however, be exemplified in many different forms and should not be construed as limited to the examples set forth herein; rather, these examples are provided for thoroughness and completeness, and fully convey the scope of the disclosure to the skilled person.

Figure 1:
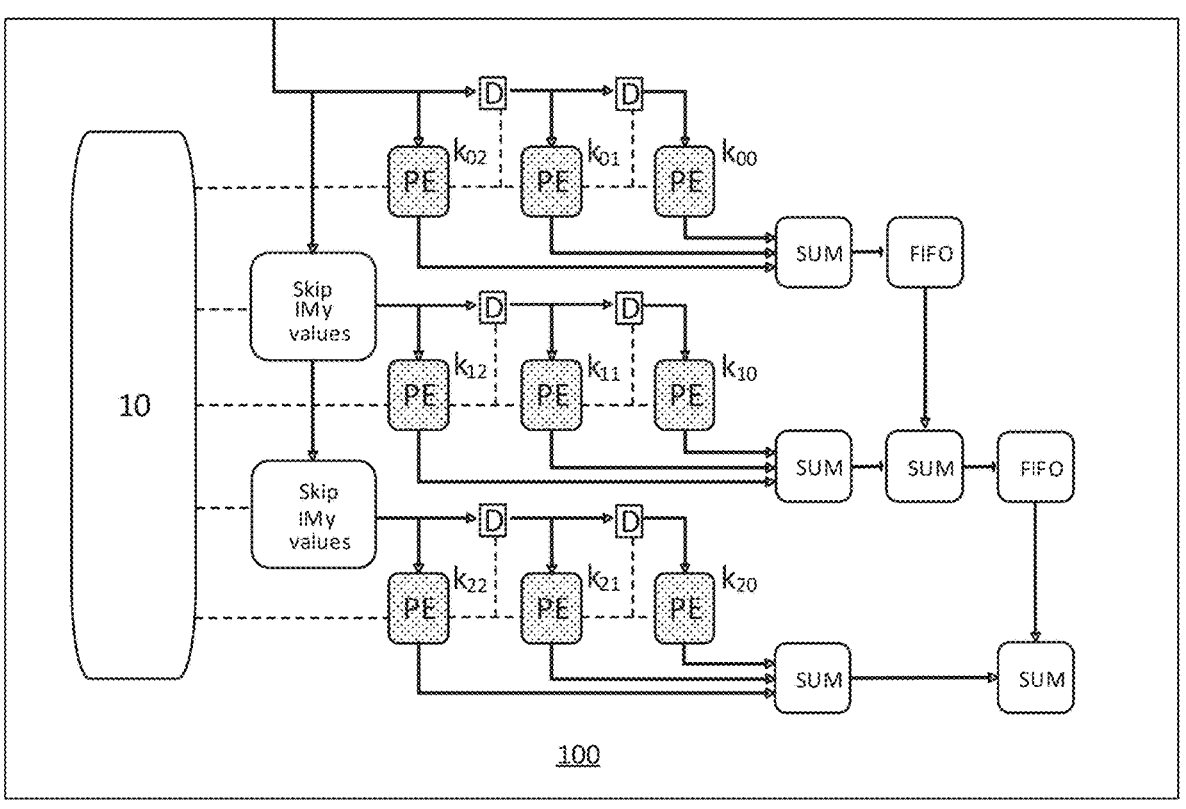
FIG. 1 is a schematic of an image convolution accelerator system.

FIG. 1 illustrates an image convolution accelerator system 100. The accelerator system 100 is illustrated for simplicity with the processing elements PE arranged in rows and columns. The processing elements PE can also be arranged in other ways than in rows and columns.

The processing elements PE corresponds to a generated Toeplitz-like kernel. The Toeplitz-like generated kernel is based on a desired kernel and padded with zeros. The Toeplitz-like generated kernel is loaded into the corresponding processing elements PE, illustrated by for example $k_{00}$ next to one of the processing elements PE. The accelerator system further comprises a controller 10 configured to activate the processing elements PE based on non-zero kernel elements in the generated Toeplitz-like kernel $k_{XY}$ and when the non-zero kernel elements are allocated to all processing elements PE in a row, such that an image is multiplied and summed up with the generated Toeplitz-like kernel. The result will then be that the image is convoluted with the Toeplitz-like kernel. The convolution is also loss less because there are no approximations in the kernel.

The implementation based on the Toeplitz-like kernel $k_{XY}$ above benefits from simple control logic required to perform convolution. Additionally, since the processing elements PE are only active when performing an operation, the system has a very low power consumption compared to other convolution systems.

The Toeplitz-like kernel $k_{XY}$ may be generated based on a desired 3×3 kernel;

| | | |
|---|---|---|
| $K_{00}$ | $K_{01}$ | $K_{02}$ |
| $K_{10}$ | $K_{11}$ | $K_{12}$ |
| $K_{20}$ | $K_{21}$ | $K_{22}$ |

The Toeplitz-like kernel $k_{XY}$ may then be generated based on the desired kernel and padded with zeros resulting in:

| $K_{00}$ | $K_{01}$ | $K_{02}$ | 0 | $K_{10}$ | $K_{11}$ | $K_{12}$ | 0 | $K_{20}$ | $K_{21}$ | $K_{22}$ | 0 | 0 | 0 | 0 | 0 |
|---|---|---|---|---|---|---|---|---|---|---|---|---|---|---|---|
| 0 | $K_{00}$ | $K_{01}$ | $K_{02}$ | 0 | $K_{10}$ | $K_{11}$ | $K_{12}$ | 0 | $K_{20}$ | $K_{21}$ | $K_{22}$ | 0 | 0 | 0 | 0 |
| 0 | 0 | 0 | 0 | $K_{00}$ | $K_{01}$ | $K_{02}$ | 0 | $K_{10}$ | $K_{11}$ | $K_{12}$ | 0 | $K_{20}$ | $K_{21}$ | $K_{22}$ | 0 |
| 0 | 0 | 0 | 0 | 0 | $K_{00}$ | $K_{01}$ | $K_{02}$ | 0 | $K_{10}$ | $K_{11}$ | $K_{12}$ | 0 | $K_{20}$ | $K_{21}$ | $K_{22}$ |

The convolution may then be performed by multiplying the Toeplitz-like kernel with a row-stacked flattened input image. Row-stacked flatten should be understood as the rows of the image being arranged after each other in single row. The Toeplitz-like kernel $k_{XY}$ may also be transposed and multiplied with the row-stacked flattened input image. The input image can in some examples be streamed or read directly in a vector format. For example, the input image can be read directly in scanline as being produced by image sensors. The image convolution accelerator is advantageous as it eliminates the need for any input buffer.

An example of the convolution by the accelerator system 100 is illustrated in FIGS. 2-17. In the illustrated accelerator system, the first row performs calculation for the first diagonal $K_{00}$, $K_{01}$, $K_{02}$, the second row performs calculations for the second diagonal $K_{10}$, $K_{11}$, $K_{12}$ and the third row performs calculations for the third diagonal $K_{20}$, $K_{21}$, $K_{22}$. The diagonals account for the valid partial sums.

In this example the input image is a 4×4 image;

| | | | |
|---|---|---|---|
| $i_{00}$ | $i_{01}$ | $i_{02}$ | $i_{03}$ |
| $i_{10}$ | $i_{11}$ | $i_{12}$ | $i_{13}$ |
| $i_{20}$ | $i_{21}$ | $i_{22}$ | $i_{23}$ |
| $i_{30}$ | $i_{31}$ | $i_{32}$ | $i_{33}$ |

The number of zeros in between the diagonals in the Toeplitz-like kernel $k_{XY}$ depends on the image size and dimension of the desired kernel. For example, the desired kernel in this example is 3×3, thus the dimension is 3. Additionally, the number of columns in the image is 4 resulting in that the number of zeros is 4−3=1. Thus, in case the image would be a 10×10 image, there would be 10−3=7 zeros before the $K_{10}$ element. Further, the number of zeros before the diagonals, except the first row, also depends on the desired kernel size. For example, if row number modulus (dimension of kernel−1) is equal to zero, then the dimension of the desired kernel−1 number of zeros are added before the diagonal.

The convolution of the image with the Toeplitz-like kernel $k_{XY}$ in the accelerator system 100 will now be described in a cycle-by-cycle step process:

Clock Cycle 0

Figure 2:
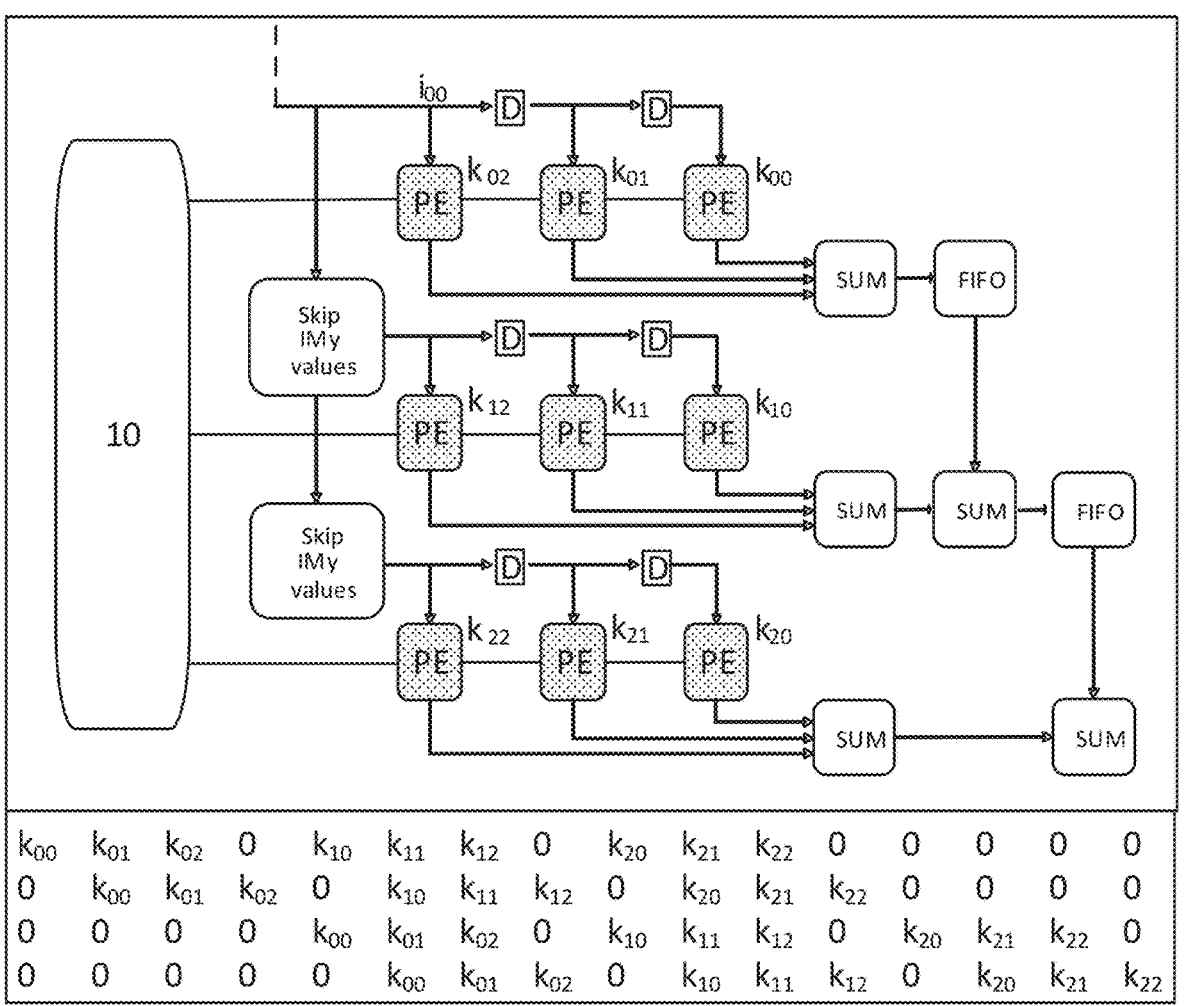
FIGS. 2-17 are schematics of an image convolution accelerator system when convolving an image with a Toeplitz-like kernel obtained from unrolling a 3×3 kernel.

Starting at FIG. 2, input value $i_{00}$ represents image data and the image data is clocked in at the first row of the processing elements PE. Illustrated in FIG. 2 are timing logic configured to time the input values, image data, between rows and/or columns of the processing elements PE. The timing logic can for instance be a simple counter that blocks the input values.

In this clock cycle, all the processing elements PE are inactive to save power, illustrated by a shaded PE symbol. Activated processing elements are illustrated by non-shaded PE symbols.

The input value $i_{00}$ is skipped for rows two and three of the processing elements PE.

Beneath the illustration of the accelerator system 100 and how the convolution progresses in the system, is the corresponding Toeplitz-like kernel $k_{XY}$ and the application of the Toeplitz-like kernel $k_{XY}$ at the different stages throughout the convolution.

Clock Cycle 1

Figure 3:
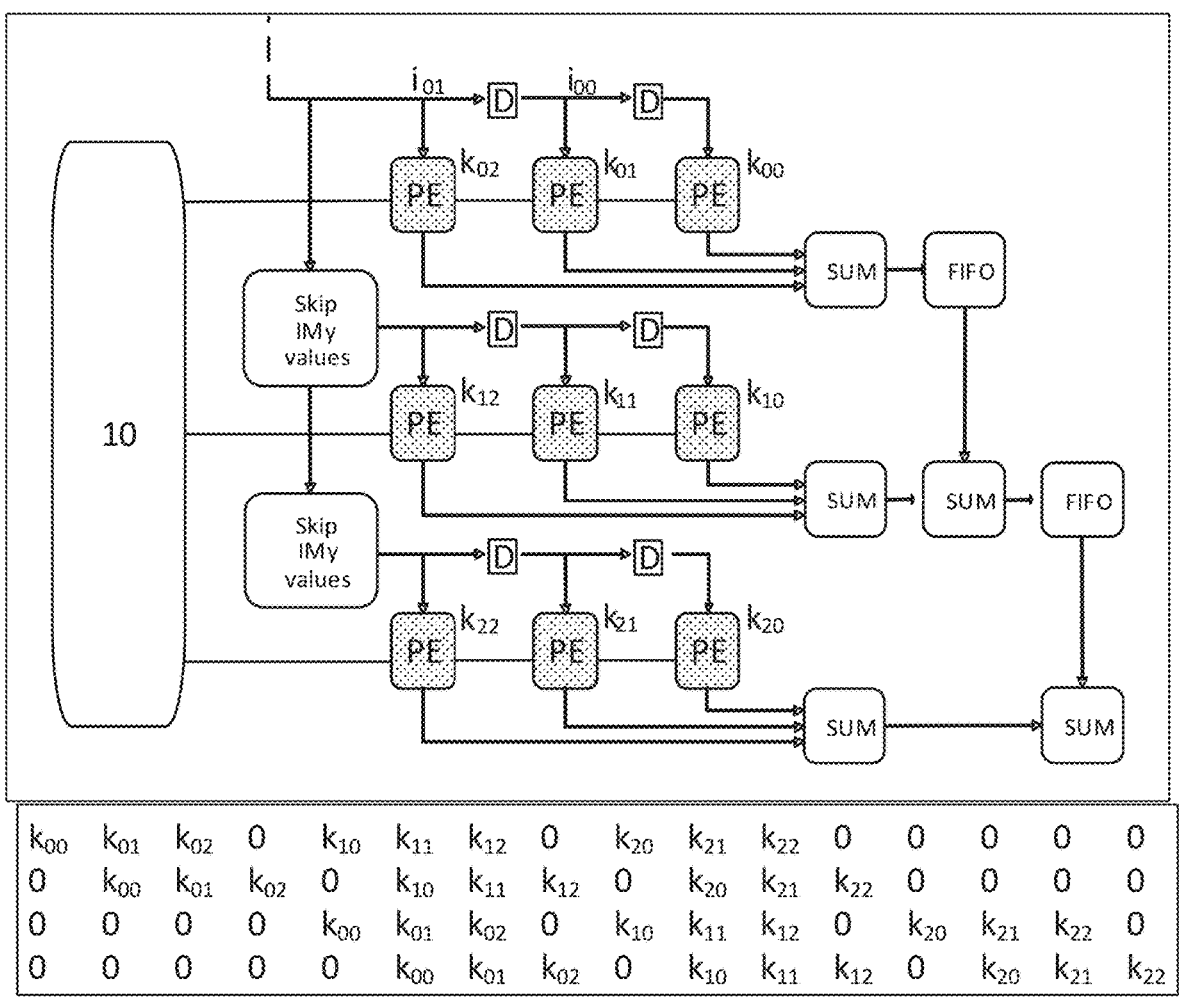

In FIG. 3, next input value $i_{01}$ of the image is clocked in on the first row. In this clock cycle, all the processing elements PE are inactivated to save power.

Clock Cycle 2

Figure 4:
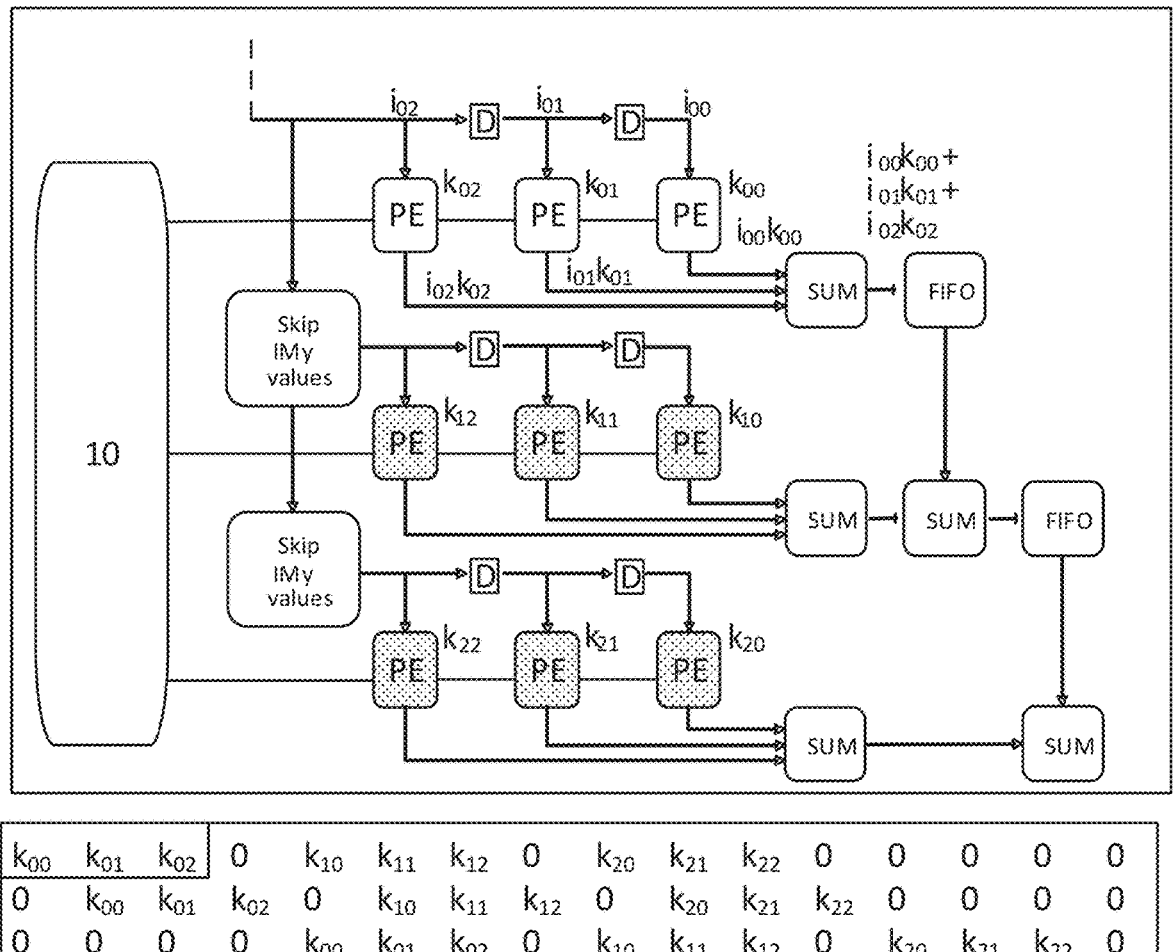

FIG. 4, now a third input value $i_{02}$ of the image is clocked in to the first row. This means that all three processing elements PE of the first row have been allocated and the processing elements PE are activated. The processing elements PE calculate partial results by multiplying respective Toeplitz-like first row kernel element $k_{00}$, $k_{01}$, $k_{02}$ with the allocated image data $i_{00}$, $i_{01}$, $i_{02}$. The partial results are summarized by arithmetic logic units, illustrated as an adder. The summarized result is stored in a first storage element, illustrated as a FIFO.

It can also be seen that the first row of the first diagonal of the Toeplitz-like kernel $k_{XY}$ is being applied for the convolution.
Clock Cycle 3

Figure 5:
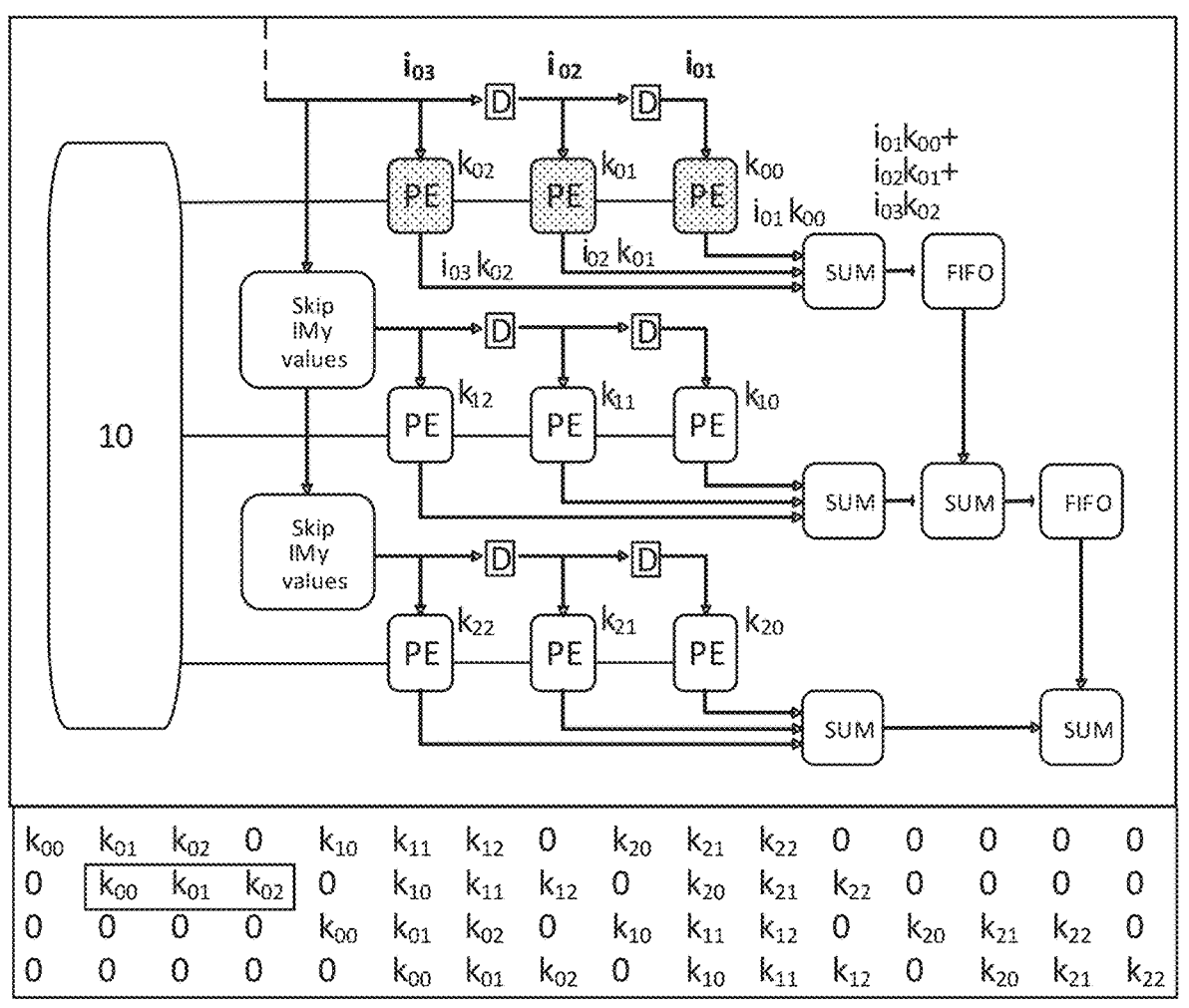

FIG. 5, next input value $i_{03}$ is clocked in at the first row. Again, all three processing elements PE of the first row have been allocated and the processing elements PE are activated. The processing elements PE calculate partial results by multiplying respective multiplying respective Toeplitz-like first row kernel element $k_{00}$, $k_{01}$, $k_{02}$ with the allocated image data $i_{01}$, $i_{02}$, $i_{03}$. The partial results are summarized, and the summarized result is stored in a storage element.

Further, the second row of the first diagonal of the Toeplitz-like kernel $k_{XY}$ is now being applied for the convolution.
Clock Cycle 4

Figure 6:
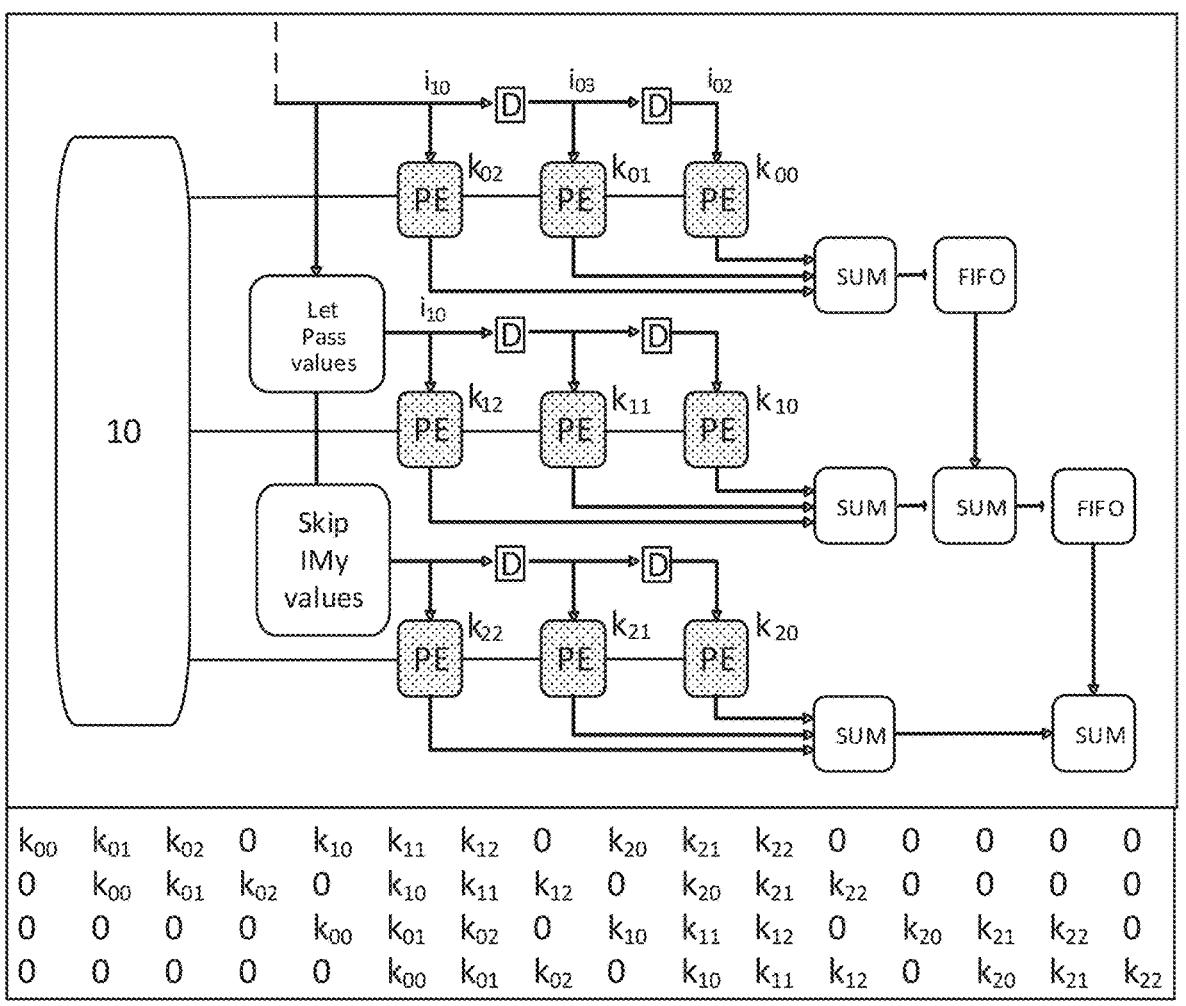

In FIG. 6, next input value for the second row of the image $i_{10}$ is clocked in on the first and second rows. The skip logic now let's the input value $i_{10}$ pass from the first to the second row since the condition for the skip logic is fulfilled. The condition is based on the number of columns in the image and that this number of input values are skipped.

Again, all the processing elements PE are inactivated.
Clock Cycle 5

Figure 7:
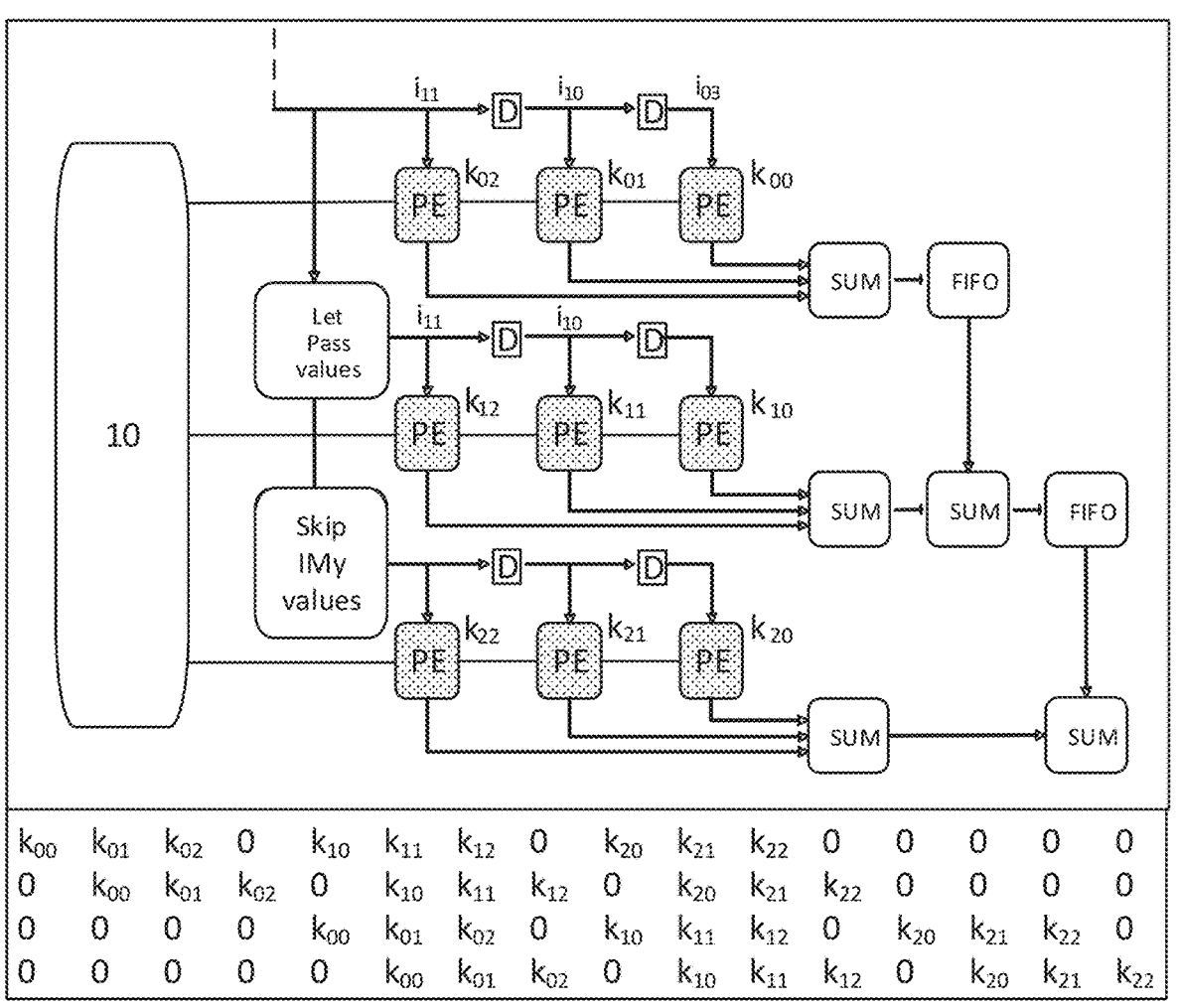

In FIG. 7, next input value $i_{11}$ for the second row of the image is clocked in on the first and second rows. Still, all processing elements PE are inactivated.
Clock Cycle 6

Figure 8:
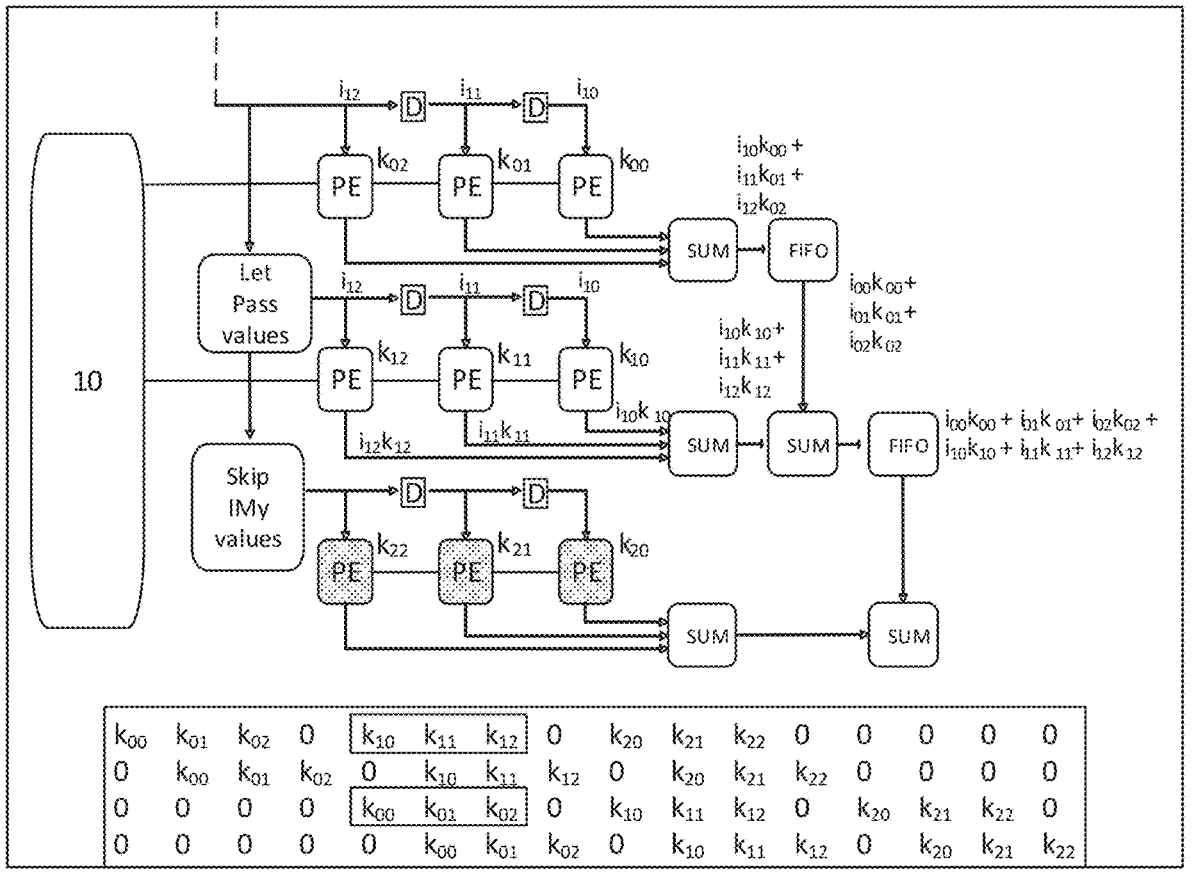

FIG. 8, now a third input value $i_{12}$ of the image is clocked in to the first and second rows. This means that all three processing elements PE of the first row and the second row have been allocated and the processing elements PE of the first and second row are activated. The processing elements PE calculate partial results by multiplying respective Toeplitz-like first row kernel elements $k_{00}$, $k_{01}$, $k_{02}$ with the allocated image data $i_{10}$, $i_{11}$, $i_{12}$ and second row kernel elements $k_{10}$, $k_{11}$, $k_{12}$ with the allocated image data $i_{10}$, $i_{11}$, $i_{12}$. The partial results of the first row are summarized and stored in the first storage element. The partial results of the second row are summarized and added together with the first stored data in the first storage element representative of the first summarized results of the first row of the image. This addition is then stored in a second storage element, also illustrated as a FIFO.

Illustrated below, the third row of the first diagonal of the Toeplitz-like kernel $k_{XY}$ is now being applied as well as the first row of the second diagonal of the Toeplitz-like kernel $k_{XY}$ for the convolution.
Clock Cycle 7

Figure 9:
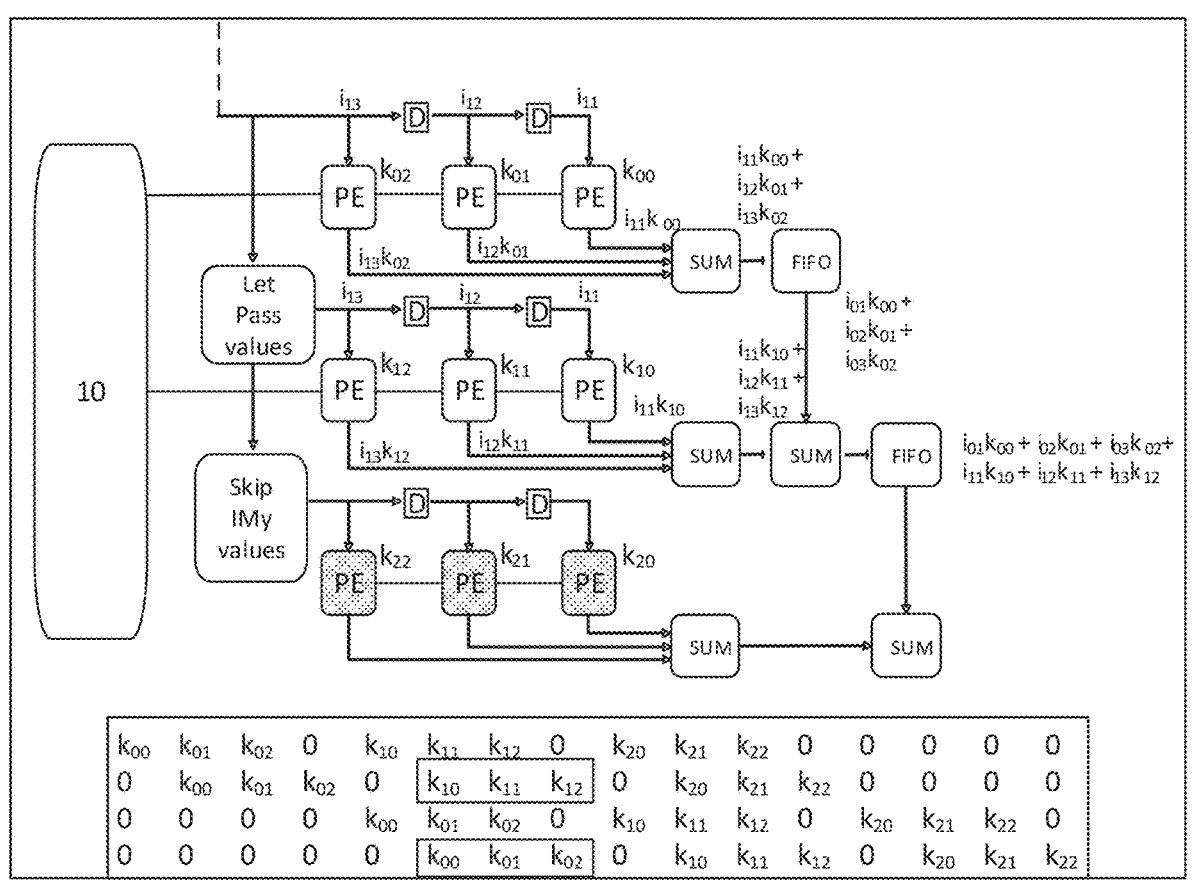

FIG. 9, next input value $i_{13}$ is clocked in at the first and second row. Again, all three processing elements PE of the first and second row have been allocated and the processing elements PE are activated.

The partial results of the first row are summarized and stored in the first storage element. The partial results of the second row are summarized and added together with the second stored data in the first storage element representative of the second summarized results of the first row of the image. This addition is then stored in the second storage element.

Now, the fourth row of the first diagonal of the Toeplitz-like kernel $k_{XY}$ is being applied as well as the second row of the second diagonal of the Toeplitz-like kernel $k_{XY}$, for the convolution.
Clock Cycle 8

Figure 10:
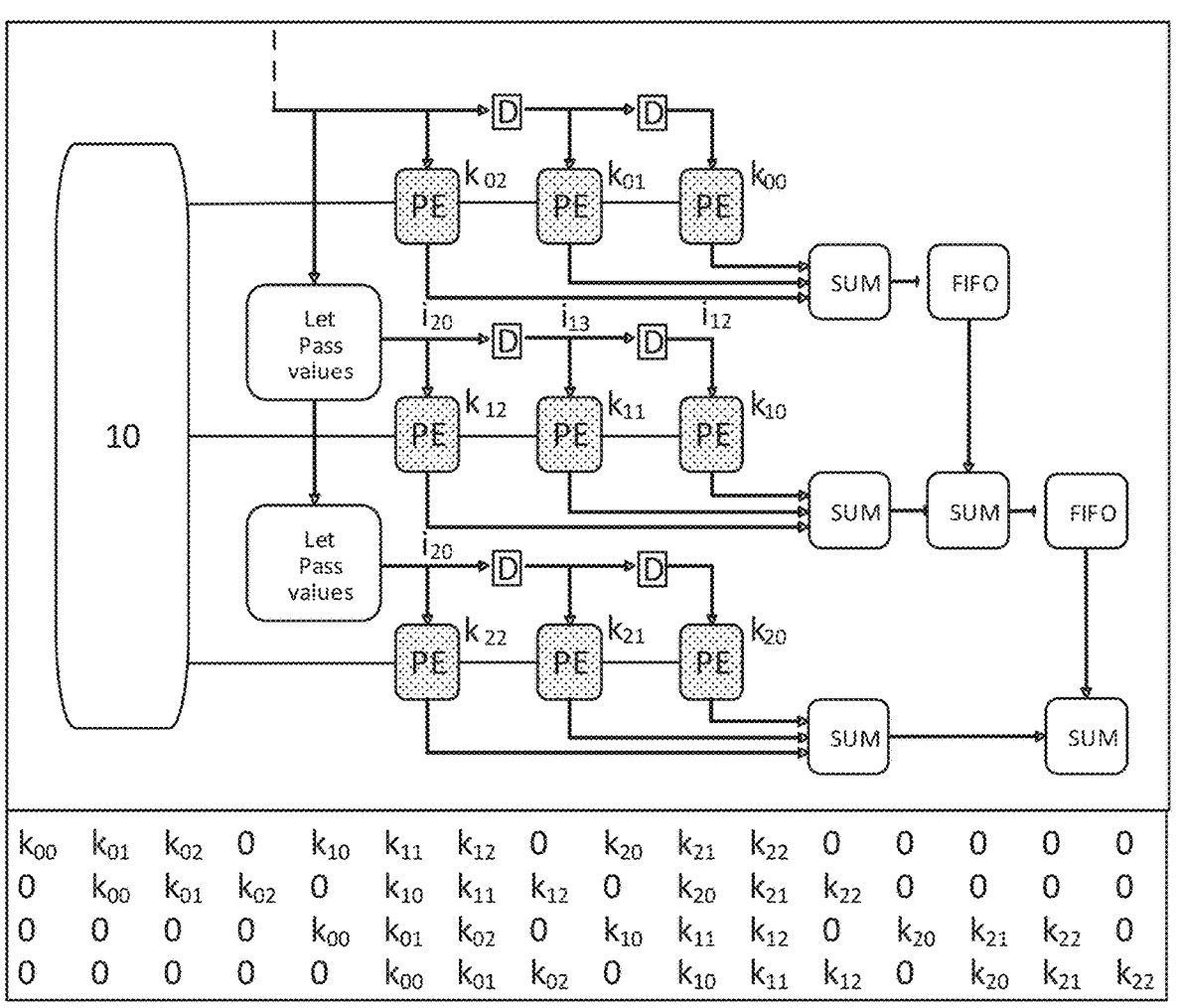

In FIG. 10, input value $i_{20}$ for the third row of the image is clocked in on the second and third rows. The calculations for the first diagonal $k_{00}$, $k_{01}$, $k_{02}$ was completed in the previous cycle 7, it would therefore now be possible, in a pipelined manner, to load new kernel elements for a new, second, convolution into the first row of processing elements PE. All processing elements PE are inactivated.
Clock Cycle 9

Figure 11:
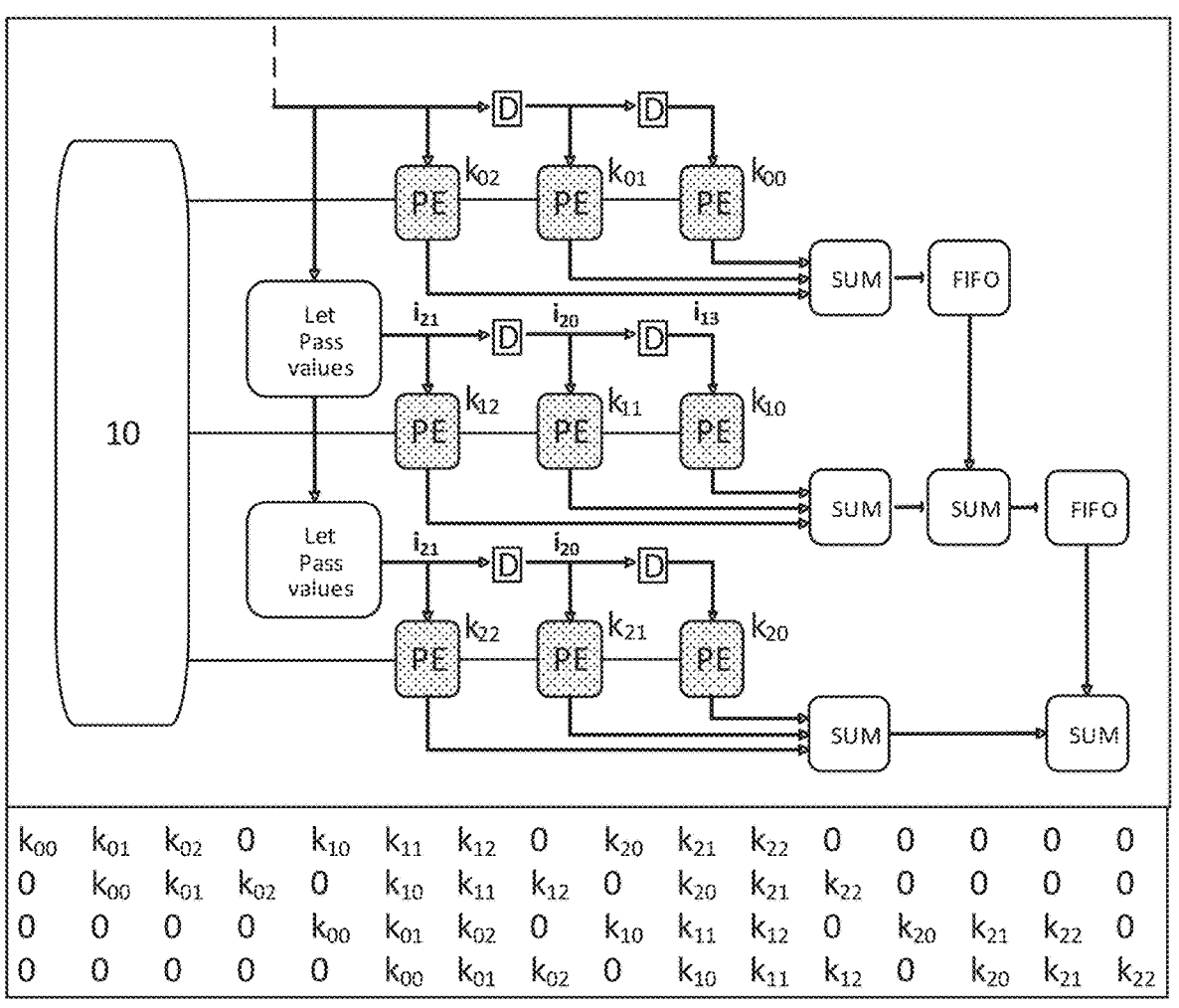

In FIG. 11, input value $i_{21}$ for the third row of the image is clocked in to the second and third rows. All processing elements PE are still inactivated.
Clock Cycle 10

Figure 12:
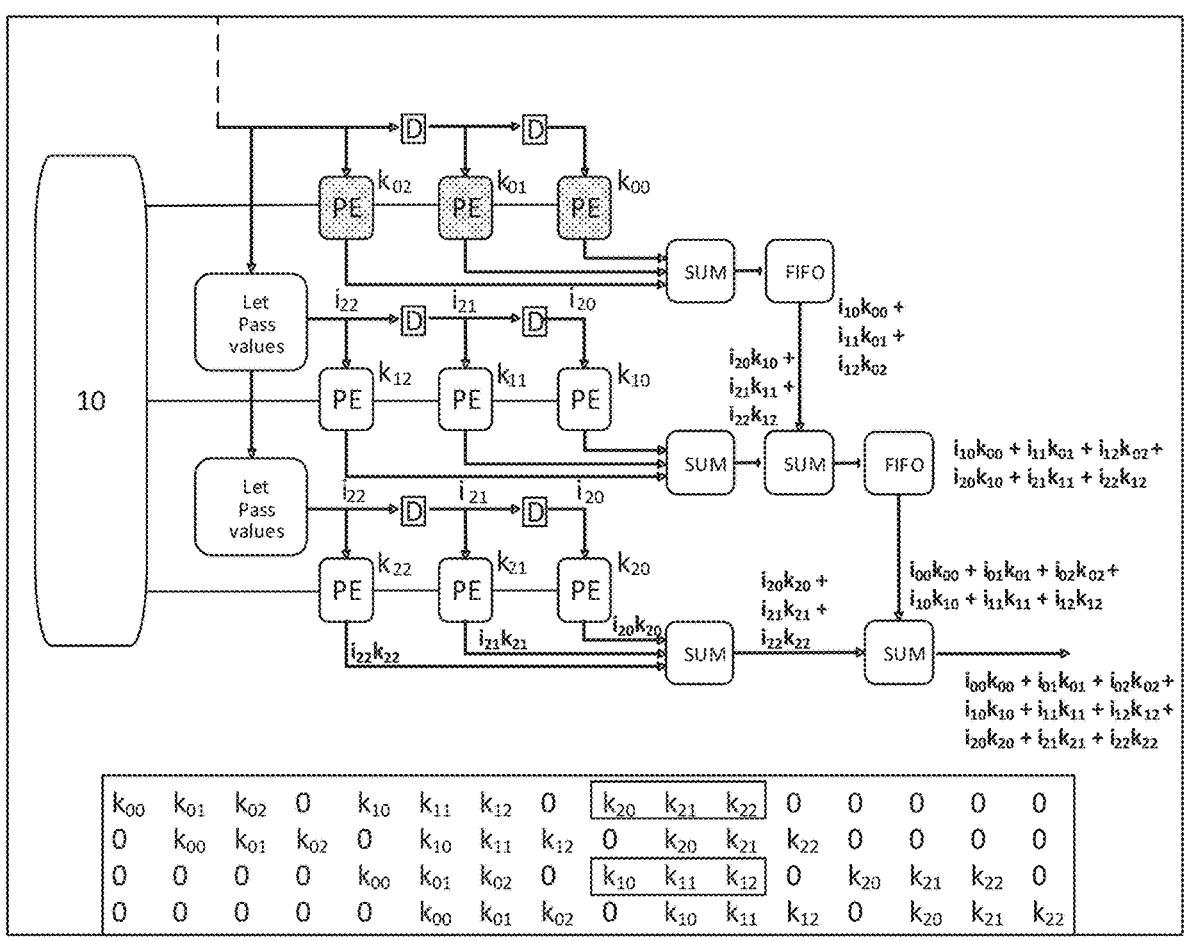

FIG. 12, a third input value $i_{22}$ of the third row of the image is clocked in to the second and third rows. Again, all three processing elements PE of the second and third row have been allocated and the processing elements PE of the second and third row are activated. The processing elements PE calculate partial results by multiplying respective Toeplitz-like second row kernel elements $k_{10}$, $k_{11}$, $k_{12}$ with the allocated image data $i_{20}$, $i_{21}$, $i_{22}$ and third row kernel elements $k_{20}$, $k_{21}$, $k_{22}$ with the allocated image data $i_{20}$, $i_{21}$, $i_{22}$.

The partial results of the second row are summarized and added together with the third stored data in the first storage element representative of the first summarized results of the second row of the image. This addition is then stored in the second storage element. The partial results of the third row are summarized and added together with the first stored data in the second storage element representative of the first summarized results of the first and second rows of the image.

Illustrated below, the third row of the second diagonal of the Toeplitz-like kernel $k_{XY}$ is being applied as well as the first row of the third diagonal of the Toeplitz-like kernel $k_{XY}$, for the convolution.
Clock Cycle 11

Figure 13:
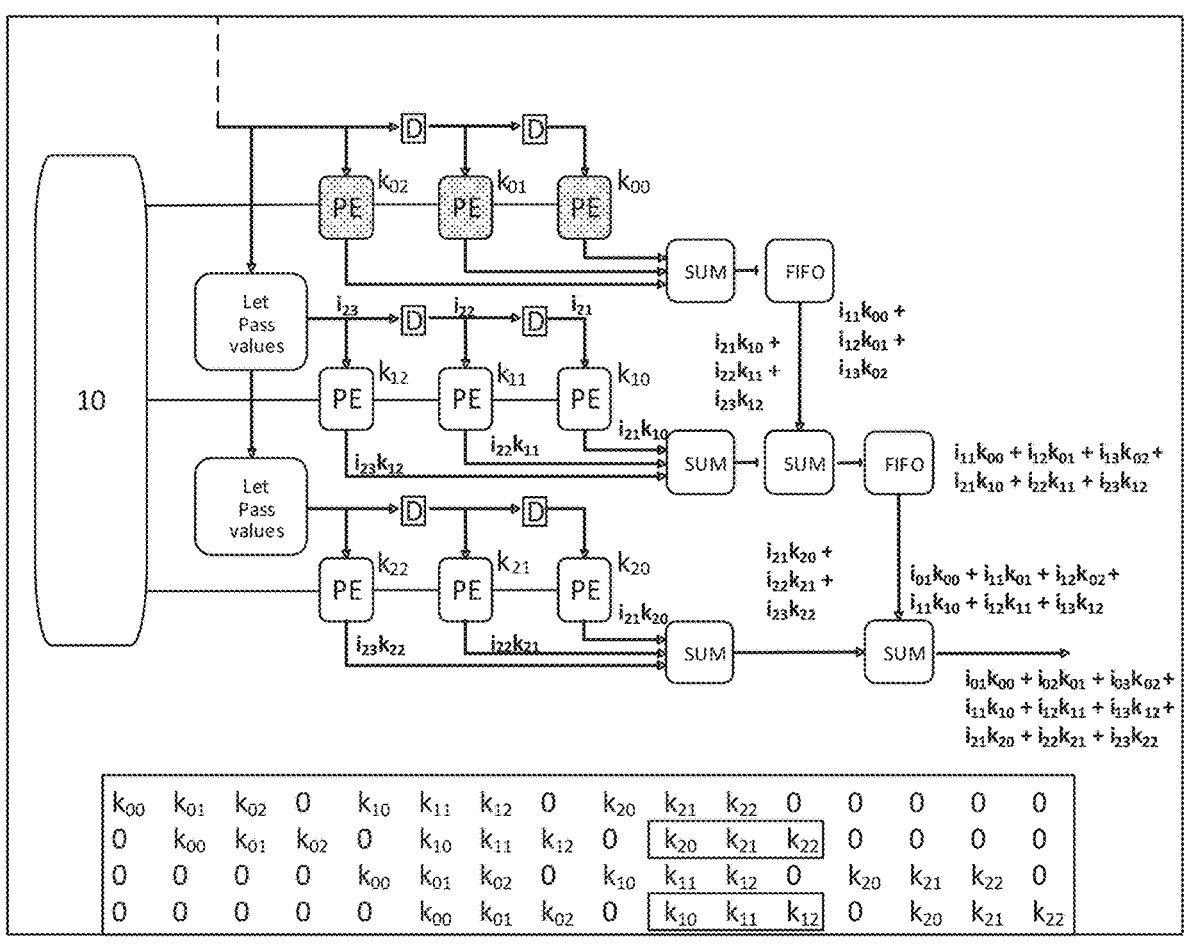

FIG. 13, a fourth input value $i_{23}$ of the third row of the image is clocked in to the second and third rows. Again, all three processing elements PE of the second and third row have been allocated and the processing elements PE of the second and third row are activated. The processing elements PE calculate partial results by multiplying respective Toeplitz-like second row kernel elements $k_{10}$, $k_{11}$, $k_{12}$ with the allocated image data $i_{21}$, $i_{22}$, $i_{23}$ and third row kernel elements $k_{20}$, $k_{21}$, $k_{22}$ with the allocated image data $i_{21}$, $i_{22}$, $i_{23}$.

The partial results of the second row are summarized and added together with the fourth stored data in the first storage element representative of the second summarized results of the second row of the image. This addition is then stored in the second storage element. The partial results of the third row are summarized and added together with the second stored data in the second storage element representative of the second summarized results of the first and second rows of the image.

Illustrated below, the fourth row of the second diagonal of the Toeplitz-like kernel $k_{XY}$ is being applied as well as the second row of the third diagonal of the Toeplitz-like kernel $k_{XY}$, for the convolution.
Clock Cycle 12

Figure 14:
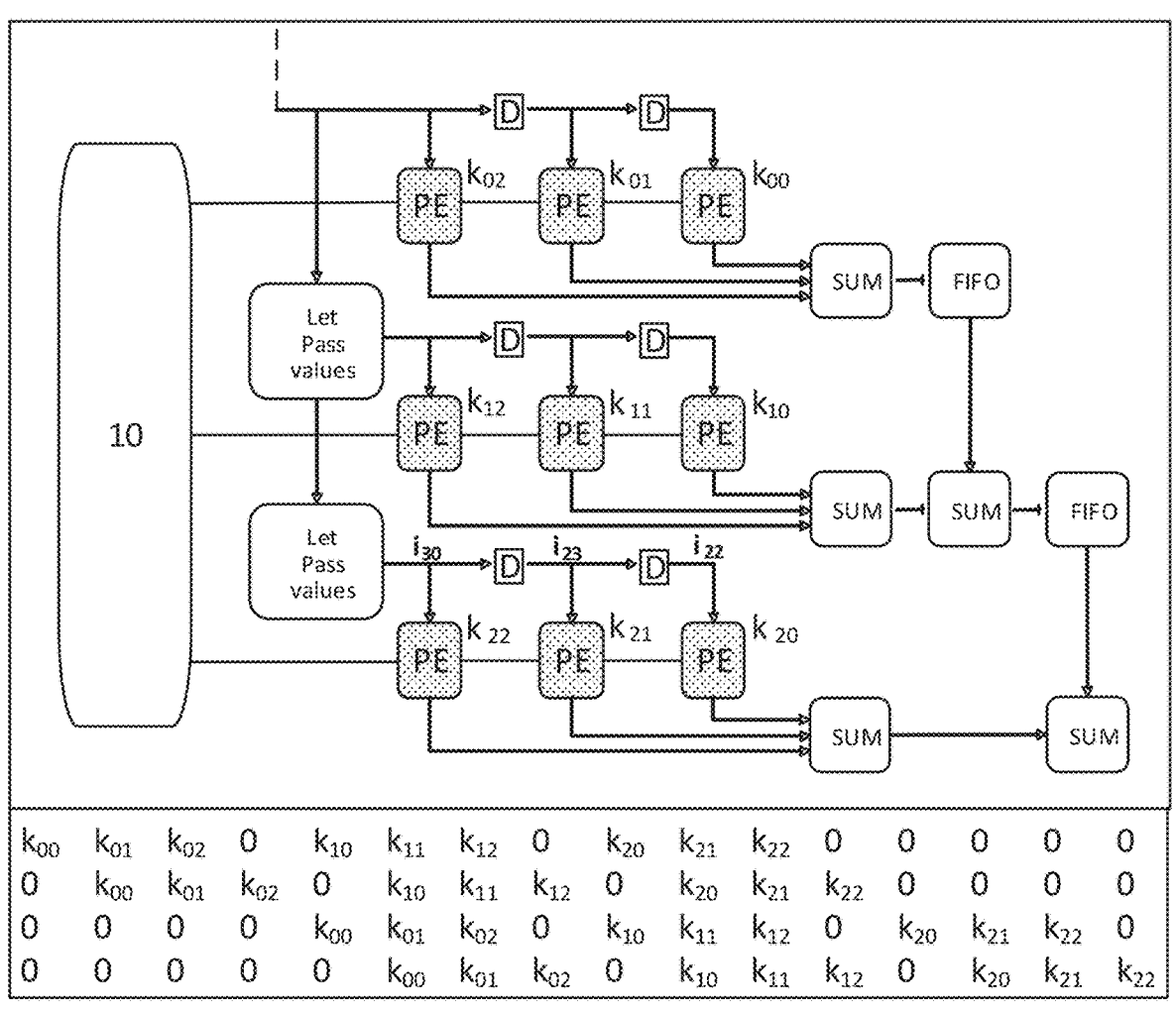

In FIG. 14, input value $i_{30}$ for the fourth row of the image is clocked in on the third row. The calculations for the second diagonal $k_{10}$, $k_{11}$, $k_{12}$ was completed in the previous cycle 11, it would therefore now be possible, in a pipelined manner, to load new kernel elements of the second convolution, initiated at cycle 8, into the second row of processing elements PE. All processing elements PE are inactivated.

Clock Cycle 13

Figure 15:
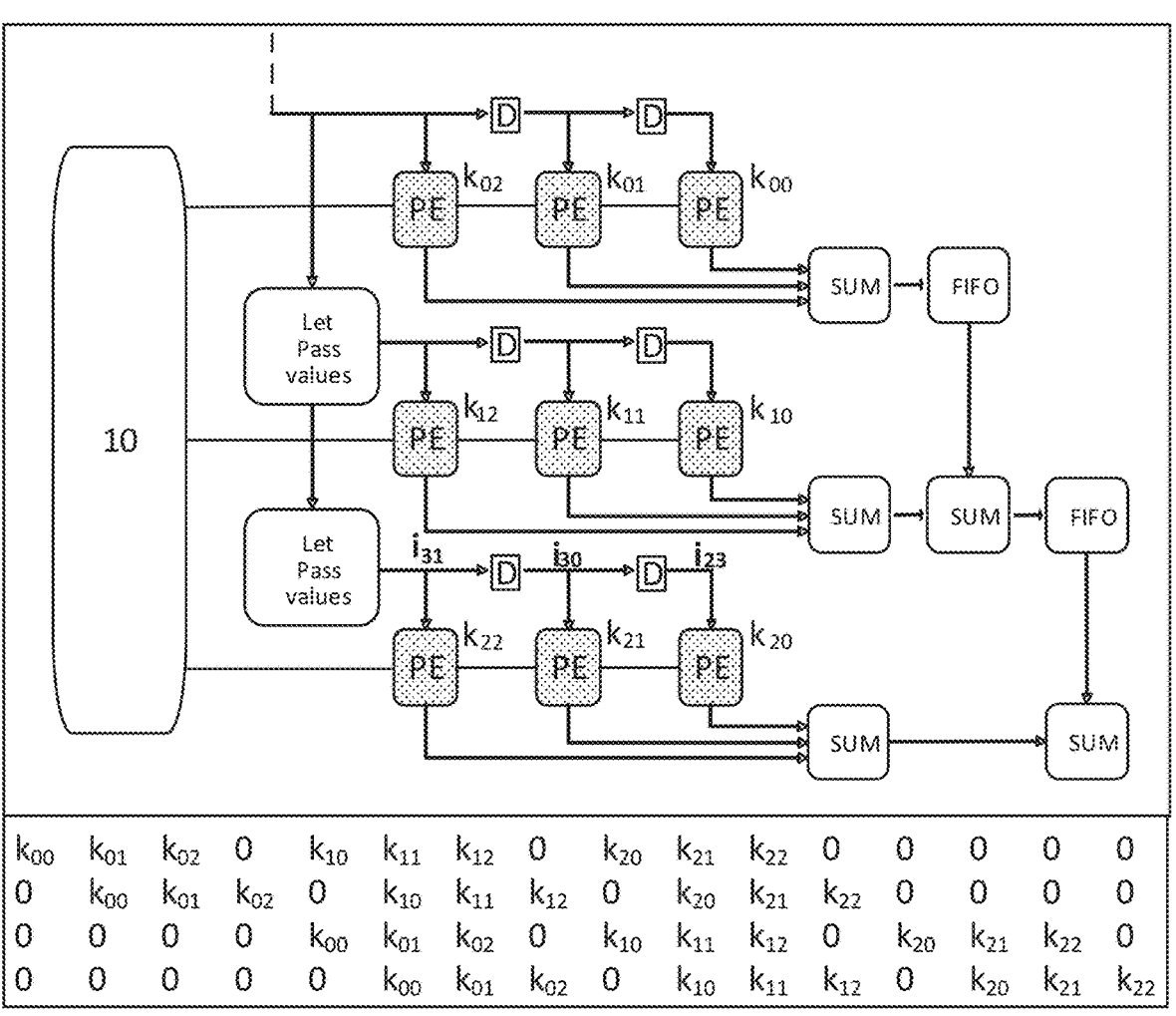

In FIG. 15, input value $i_{31}$ for the fourth row of the image is clocked in on the third row. All processing elements PE are still inactivated.

Clock Cycle 14

Figure 16:
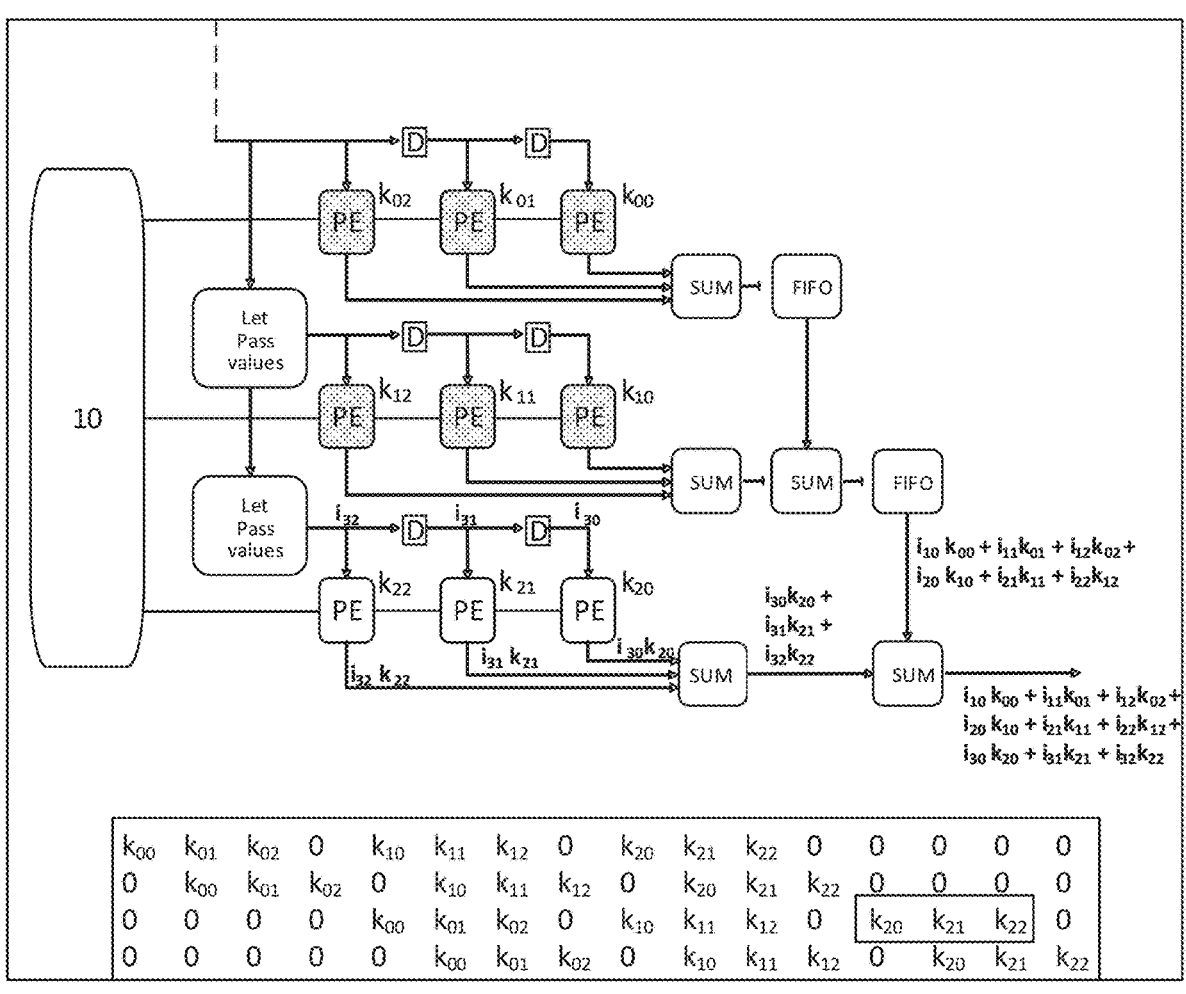

In FIG. 16, input value $i_{32}$ for the fourth row of the image is clocked in on the third row. This means that all three processing elements PE of the third row have been allocated and the processing elements PE of the third row are activated.

The processing elements PE calculate partial results by multiplying respective Toeplitz-like third row kernel elements $k_{20}$, $k_{21}$, $k_{22}$ with the allocated image data $i_{30}$, $i_{31}$, $i_{32}$. The partial results of the third row are summarized and added together with the first stored data in the second storage element representative of the first summarized results of the second and third rows of the image.

The third row of the third diagonal of the Toeplitz-like kernel $k_{XY}$ is now being used for the convolution.

Clock Cycle 15

Figure 17:
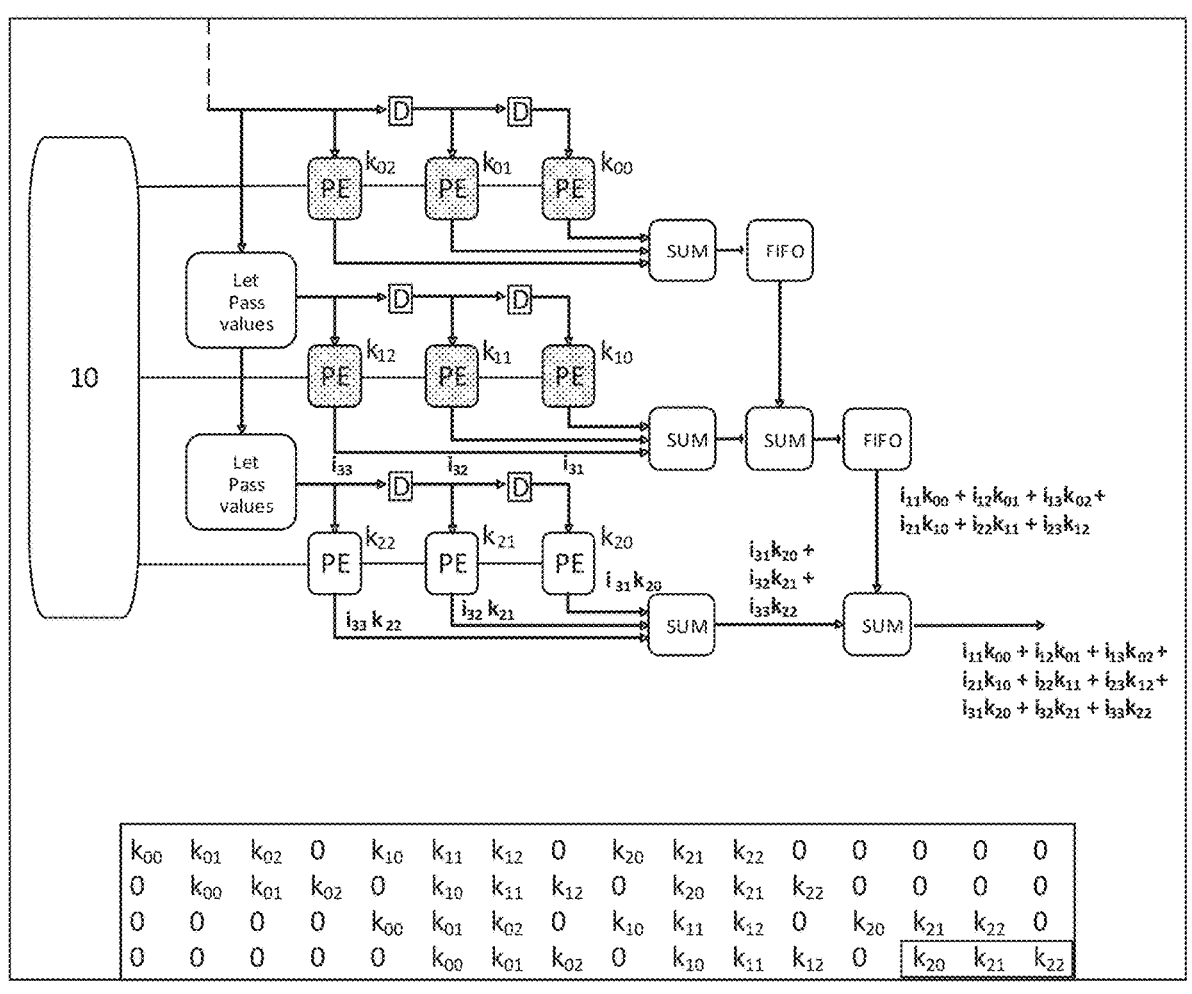

In FIG. 17, last input value $i_{33}$ for the fourth row of the image is clocked in on the third row. This means that all three processing elements PE of the third row have been allocated and the processing elements PE of the third row are activated.

The processing elements PE calculate partial results by multiplying respective Toeplitz-like third row kernel elements $k_{20}$, $k_{21}$, $k_{22}$ with the allocated image data $i_{31}$, $i_{32}$, $i_{33}$. The partial results of the third row are summarized and added together with the second stored data in the second storage element representative of the second summarized results of the second and third rows of the image.

The fourth row of the third diagonal of the Toeplitz-like kernel $k_{XY}$ is now being used for the convolution.

Thus, a full convolution of the 4×4 image with the 16×4 Toeplitz-like kernel $k_{XY}$ is accomplished in 16 clock cycles.

In this example, two clock cycles are used as a break to fill the processing elements PE and then two clock cycles for calculation of results. The two clock cycles are due to the two additional zeros in the Toeplitz-like kernel.

In some examples the arrangement of the processing elements (PE) corresponding to the generated Toeplitz-like kernel ($k_{XY}$) is scaled for other kernels such as a 5×5 kernel having 5 rows, each with 5 processing elements (PE) or a 7×7 kernel having 7 rows, each with 7 processing elements.

It would also be possible to combine a 7×7 kernel having 7 rows, each with 7 PEs and add 1 additional PE resulting in a 7×7+1 PE. That would allow for 1 convolution with a 7×7 kernel, 2 parallel convolutions with a 5×5 kernel or 5 parallel convolutions with a 3×3 kernel (there would be 5 PEs idle and could be inactivated). Hence, there are many different ways of arranging the processing elements PE so that they correspond to the generated Toeplitz-like kernel. It would also be possible to use logic that could be configured or reconfigured to accommodate the above different kernel solutions, such as a software solution comprising processing elements or objects.

In case a bigger processing element arrangement is used and if it also is configured to implement smaller kernel convolutions in parallel, the storage elements need to be as many as needed for the parallel smaller kernels. For example, if we use a 7×7 kernel and also want to be able to do 5 3×3 kernel convolutions in parallel, 6 storage elements are needed. Or, if 5 3×3 Kernels are desired, 5*2 storage elements=10 storage elements. Generally, the amount of storage elements is calculated as the maximum dimension of supported kernel−1.

It would also be possible to split storage elements to accommodate more storage elements with a smaller size. In this way a greater use of the total memory could be achieved, instead of having a lower utilization due to having several different-sized storage elements, or FIFOs, for each different-sized convolution. The storage element or FIFO may then be configured to store at least the number of columns in the image minus a dimension of the kernel+1, calculations of the processing elements.

Figure 18:
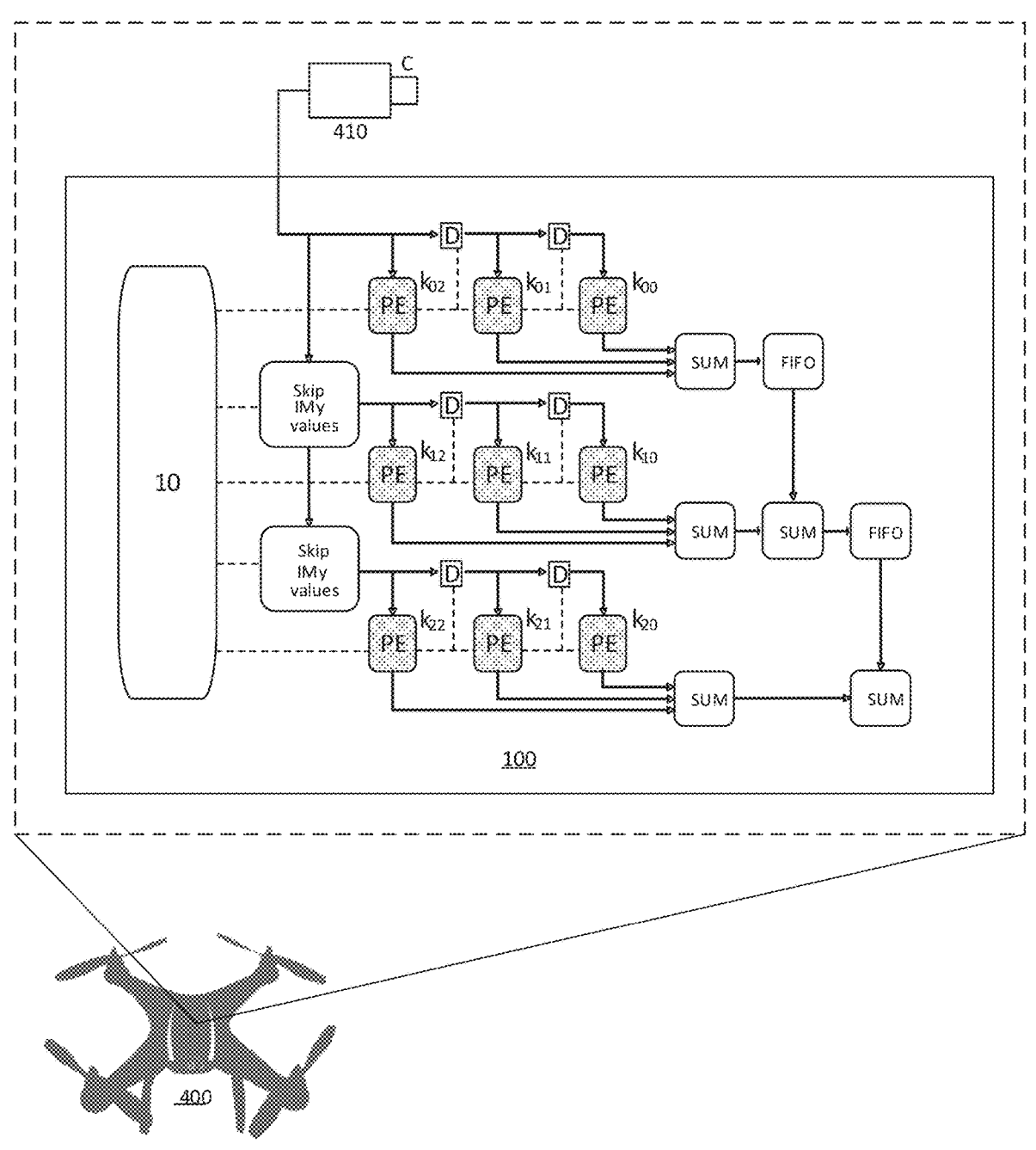
FIG. 18 is a top view of a drone comprising an image convolution accelerator system and a camera.

In some examples, an imaging apparatus 400 comprises an imaging unit 410 configured to acquire an input image and the image convolution accelerator system 100, illustrated in FIG. 18, wherein a drone is illustrated. Such imaging apparatuses could be autonomous cars or augmented reality apparatuses. Generally, the image convolution accelerator system 100 can be used in any kind of convolution-based machine learning system and that could be used for example for cancer detection, object detection, segmentation, depth prediction, classification, image reconstruction, compression, big data processing, anonymization of data, recognition and much more.

Functions and operations of the image convolution accelerator system 100 may be embodied in the form of executable logic routines (e.g., lines of code, software programs, etc.) that are stored on a non-transitory computer readable medium such as a memory. The logic routines may be executed by a control circuit such as a processor. Furthermore, the functions and operations of the image convolution accelerator system 100 may be a stand-alone software application or form a part of a software application that carries out additional tasks related to the image convolution accelerator system 100. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

A software could be a software program that causes a computer to execute the steps of generating a Toeplitz-like kernel $k_{XY}$, the Toeplitz-like generated kernel $k_{XY}$ is based on a desired kernel and padded with zeros, allocating processing elements PE arranged in rows and columns corresponding to the generated Toeplitz-like kernel $k_{XY}$ and activating processing elements PE based on non-zero kernel elements in the generated Toeplitz-like kernel $k_{XY}$ and when the non-zero kernel elements are allocated to all processing elements PE in a row, such that the input image is multiplied with the generated Toeplitz-like kernel $k_{XY}$. The software program may be stored on a non-transitory storage medium.

For even further improved image processing performance may the convolution accelerator system 100 be combined with a parallel memory system that supports simultaneous write and read of many different data patterns. The parallel memory system comprises multiple memory banks, a method to tag the image and to distribute it into the different memory banks, and auxiliary functions/circuitry to enable the flexible data access with high implementation efficiency. The parallel memory system is discussed in more detail in the application with the title "SYSTEM AND METHOD FOR HIGH-THROUGHPUT IMAGE PROCESSING" filed on the same day as this application and by the same inventors.

It will be appreciated that the present disclosure is not limited to the embodiments shown. Several modifications and variations are thus conceivable within the scope of the disclosure which thus is exclusively defined by the appended claims.

The invention claimed is:

1. An image convolution accelerator system comprising,
   processing elements (PE) comprising kernel elements corresponding to a generated Toeplitz-like kernel being a doubly block-circulant matrix, the Toeplitz-like generated kernel is based on a desired convolution kernel and padded with zeros,
   an image controller (10) configured to activate the processing elements (PE) to multiply the kernel elements with image data when image data from a same row of the image is allocated to all processing elements (PE) corresponding to a non-zero row of the Toeplitz-like kernel, and
   at least one storage element,
   wherein the storage element is configured to store at least the number of columns of the image minus a dimension of the desired convolution kernel+1.

2. The image convolution accelerator system according to claim 1, further comprising arithmetic logic units configured to add the multiplications by the processing elements (PE) and/or a storage element.

3. The image convolution accelerator device according to claim 1, wherein a number of storage elements are calculated as a dimension of the desired convolution kernel−1.

4. The image convolution accelerator device according to claim 1, further comprising timing logic configured to time image data between the processing elements.

10

5. An imaging apparatus comprising,
   an imaging unit configured to acquire an input image, and
   the image convolution accelerator system according to claim 1.

6. An image processing method comprising the steps of,
   generating a Toeplitz-like kernel being a doubly block-circulant matrix, the Toeplitz-like generated kernel is based on a desired convolution kernel and padded with zeros,
   activating processing elements comprising kernel elements corresponding to the generated Toeplitz-like kernel, such that the kernel elements are multiplied with image data when image data from a same row of the image is allocated to all processing elements (PE) corresponding to a non-zero row of the Toeplitz-like kernel, and
   storing, on at least one storage element, at least the number of columns of the image minus a dimension of the desired convolution kernel+1.

7. A non-transitory storage medium storing a program that causes a computer to execute the steps of:
   generating a Toeplitz-like kernel being a doubly block-circulant matrix, the Toeplitz-like generated kernel is based on a desired convolution kernel and padded with zeros,
   activating processing elements comprising kernel elements corresponding to the generated Toeplitz-like kernel, such that the kernel elements are multiplied with image data when image data from a same row of the image is allocated to all processing elements (PE) corresponding to a non-zero row of the Toeplitz-like kernel, and
   storing, on at least one storage element, at least the number of columns of the image minus a dimension of the desired convolution kernel+1.

* * * * *